United States Patent
Iwai

(10) Patent No.: US 7,965,885 B2
(45) Date of Patent: Jun. 21, 2011

(54) IMAGE PROCESSING METHOD AND IMAGE PROCESSING DEVICE FOR SEPARATING THE BACKGROUND AREA OF AN IMAGE

(75) Inventor: Yoshiaki Iwai, Tokyo (JP)

(73) Assignee: Sony Corporation, Tokyo (JP)

( * ) Notice: Subject to any disclaimer, the term of this patent is extended or adjusted under 35 U.S.C. 154(b) by 1501 days.

(21) Appl. No.: 11/240,555

(22) Filed: Oct. 3, 2005

(65) Prior Publication Data

US 2006/0072022 A1    Apr. 6, 2006

(30) Foreign Application Priority Data

Oct. 6, 2004    (JP) ............................. P2004-294241

(51) Int. Cl.
*G06K 9/00* (2006.01)
(52) U.S. Cl. ........................................ 382/154; 382/106
(58) Field of Classification Search .................. 382/154
See application file for complete search history.

(56) References Cited

U.S. PATENT DOCUMENTS

| | | | |
|---|---|---|---|
| 6,236,748 B1 * | 5/2001 | Iijima et al. ................... | 382/154 |
| 6,532,022 B1 * | 3/2003 | Ahmad ......................... | 345/629 |
| 6,556,704 B1 * | 4/2003 | Chen ............................ | 382/154 |
| 6,661,918 B1 * | 12/2003 | Gordon et al. ................ | 382/173 |
| 2001/0052935 A1 * | 12/2001 | Yano ............................. | 348/207 |
| 2002/0051491 A1 * | 5/2002 | Challapali et al. ......... | 375/240.2 |
| 2003/0091225 A1 * | 5/2003 | Chen ............................ | 382/145 |
| 2004/0041905 A1 * | 3/2004 | Shibayama .................... | 348/47 |
| 2004/0190752 A1 * | 9/2004 | Higaki et al. ................ | 382/103 |

FOREIGN PATENT DOCUMENTS

| | | |
|---|---|---|
| JP | 9-200714 | 7/1997 |
| JP | 2000-20722 | 1/2000 |
| JP | 2000-200359 | 7/2000 |
| JP | 2003-304562 | 10/2003 |
| JP | 2004-206320 | 7/2004 |

OTHER PUBLICATIONS

Andrea Fusiello et al., "A Compact Algorithm for Rectification of Stereo Pairs", Machine Vision and Applications, Jul. 2000, 12, pp. 16 to 22.
Office Action mailed on Oct. 19, 2010 in counterpart Japanese Patent Application No. 2004-294241 (2 pages).

* cited by examiner

*Primary Examiner* — Bhavesh Mehta
*Assistant Examiner* — David P Rashid
(74) *Attorney, Agent, or Firm* — Finnegan, Henderson, Farabow, Garrett and Dunner, L.L.P.

(57) ABSTRACT

The invention aims at separating a background area of an image using a plurality of cameras by utilizing a method of estimating a background in combination with a stereo method. Data on input images, synchronous with one another, which are obtained by photographing images of a subject from different points of sight using at least two cameras is stored in a frame memory. A background area estimation processing unit performs global image superimposition for the input images, synchronous with one another, the data on which is stored in the frame memory on the assumption that a background area is in the distance and has a flat surface. Then, the background area estimation processing unit estimates the background area based on a degree of local similarity. A distance image generation processing unit performs distance measurement with respect to points other than those in the estimated background area by utilizing a stereo method to generate distance images. A background separated image generation processing unit removes the image of an area in a predetermined distance or more from the input images by referring to resulting distance images to generate a background removed image.

7 Claims, 14 Drawing Sheets

FIG.5
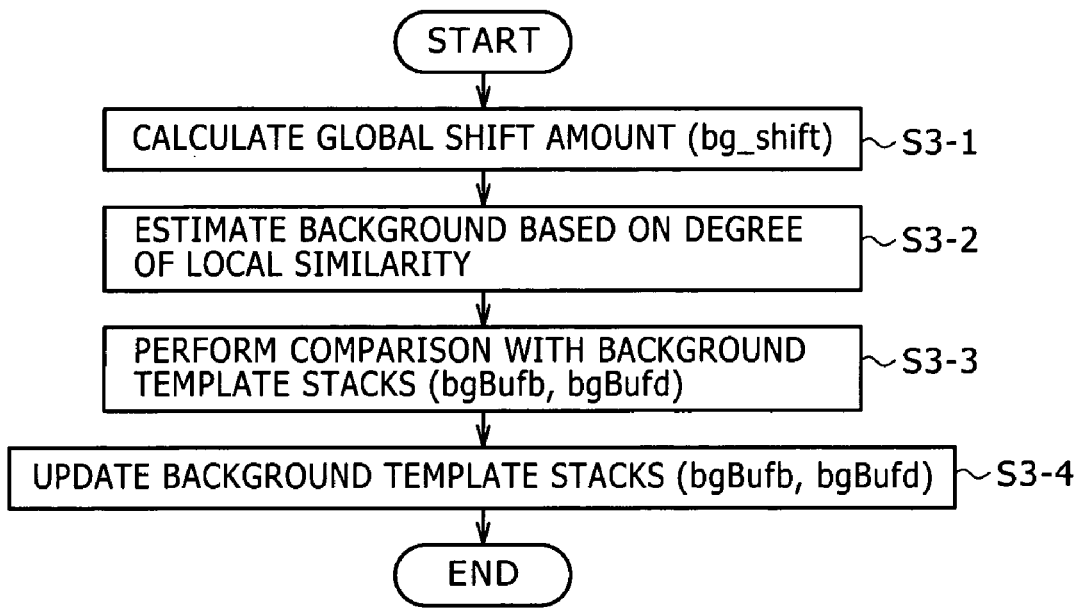
FIG.6
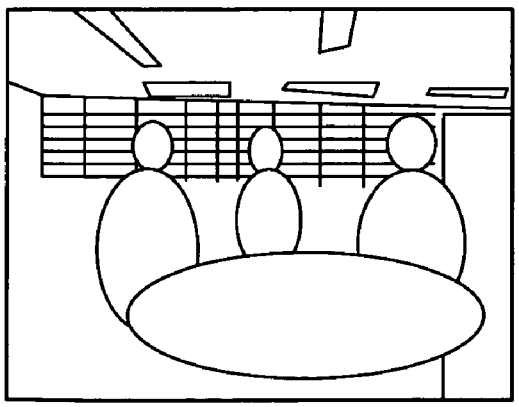
Ib (u, v)
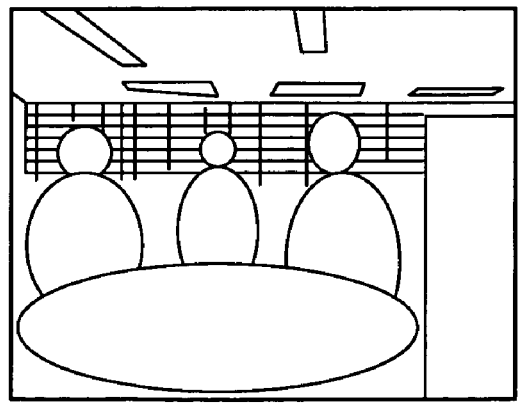
Id (u, v)

FIG.15
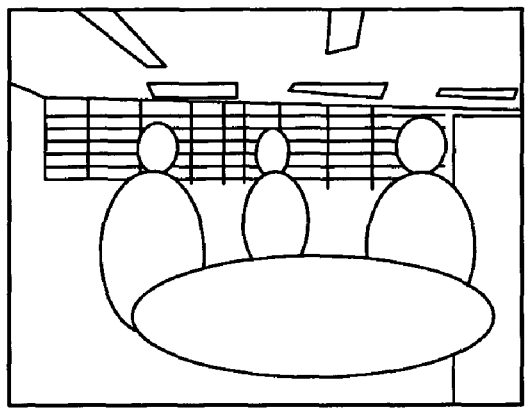
REFERENCE
IMAGE Ib (u, v)
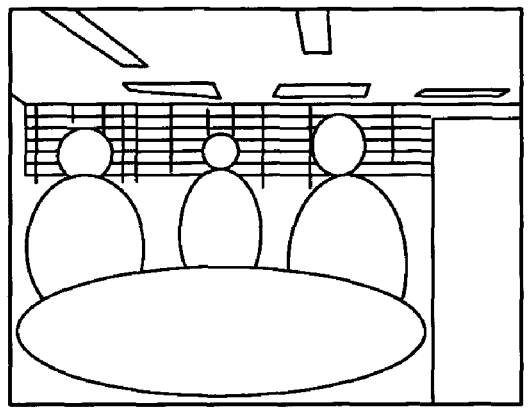
DETECTED
IMAGE Id (u, v)
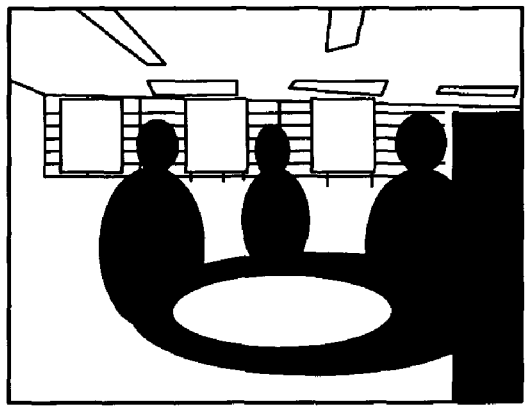
BACKGROUND AREA
MASKS $Rb_{bg}(u, v)$
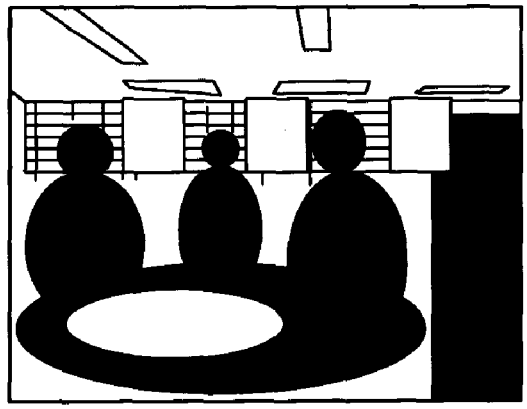
BACKGROUND AREA
MASKS $Rd_{bg}(u, v)$

IMAGE PROCESSING METHOD AND IMAGE PROCESSING DEVICE FOR SEPARATING THE BACKGROUND AREA OF AN IMAGE

CROSS REFERENCES TO RELATED APPLICATIONS

The present invention contains subject matter related to Japanese Patent Application JP 2004-294241 filed in the Japanese Patent Office on Oct. 6, 2004, the entire contents of which being incorporated herein by reference.

BACKGROUND OF THE INVENTION

The present invention relates to an image processing method and an image processing device which are capable of separating a background area of an image.

In recent years, a visual communication apparatus with a camera has begun to come into wide use. For example, a system for a television conference which a plurality of persons join is known in the field of business, while a communication system which utilizes a Web camera is known in the personal field. In such systems, a display image of the other party is displayed on a display device, and an image of a user who visually observes the screen of the display device is captured as an image of a photographing object. The resulting image signal is transmitted to an image processing device on the other party side through a network including a public line, a dedicated line or the like, whereby it becomes possible to make both the users have the realistic sensations.

However, a problem common to those systems is such that information on an area other than a person is desired not to be transmitted to the other party. The present system with which all the information on an image captured with a camera is transmitted to the other party involves such a limitation that the system must be installed in a place an image of which may be shown to the other party.

Then, a method is expected in which an image part of a person (foreground) and an image part of a background are separated from each other, the image part of the background is subjected to some processing or other, and so forth.

That is, a foreground area containing an image of moving objects such as a user is cut down from a moving image which is captured in a camera system, and the cut-down image of the moving objects is subjected to predetermined processing, whereby robust image processing becomes possible which is hardly influenced by the feature of the background. In addition, when information on the background is desired not to be sent to the other party, the foreground and the background are separated from each other and only information on the foreground is delivered, thereby realizing the robust image processing.

Here, as regards a method of separating a background and a foreground from each other, for example, there is known a method in which a person area is specified by using a heat sensor, and a background area is subjected to predetermined image processing (see Patent document 1 for example), a method in which a movement area is detected based on a background difference, an interframe difference, and a stereo method to be made a foreground (see Patent document 2 for example), a method in which a distance region is specified and information on an image falling within the distance region is outputted (see Patent document 3 for example), or the like.

Patent document 1:
Japanese Patent Laid-open No. Hei 9-200714
Patent document 2:
Japanese Patent Laid-open No. 2000-20722
Patent document 3:
Japanese Patent Laid-open No. 2000-200359

SUMMARY OF THE INVENTION

However, in case of the method disclosed in Patent document 1 in which the person area is specified by using the heat sensor and the background area is subjected to the predetermined image processing, the heat sensor is generally expensive and a sensor, other than a camera, required for the visual communication apparatus must be provided. In addition, in case of the method disclosed in Patent document 2 in which the movement region is determined based on the background difference, the interframe difference, and the stereo method to be made the foreground, it-is necessary to acquire the image having no person image taken therein in advance due to adoption of the background difference. Thus, this method involves a problem in terms of convenience. Moreover, in case of the method disclosed in Patent document. 3 in which the distance range is specified and the information on the image falling within that range is outputted, when the distance is measured by utilizing the stereo method, if many repetitive patterns or occlusions are contained in the input scene, it is difficult to perform the distance measurement with high accuracy. Furthermore, as regards other techniques, there are known a method of dividing an area of a captured image, a method of recognizing a person, and the like. However, those methods are actually yet established in terms of a robust property and accuracy.

In the light of the above-mentioned problems associated with the prior art, the present invention therefor is desired to provide an image processing method and an image processing device which are capable of combining a stereo method and a method of estimating a background with each other by using images captured with a plurality of cameras in order to separate a background area of an image.

Other objects of the present invention and concrete advantages obtained by the present invention will be made clearer from the preferred embodiments which will be described below.

According to an embodiment of the present invention, there is provided an image processing method including: a capturing step of capturing images of a subject from different points of sight with at least two cameras to obtain input images synchronous with one another; a background area estimating step of estimating a background area based on a degree of similarity after global image superimposition is performed on the assumption that the background area is in the distance and has a flat surface with respect to each of the input images obtained in the capturing step; a distance image generating step of performing distance measurement by utilizing a stereo method to generate distance images with respect to points other than those in the background area estimated in the background area estimating step; and a background separated image generating step of removing the image of the area in a predetermined distance or more from each of the input images by referring to the distance images generated in the distance image generating step to generate a background separated image.

Preferably, in the image processing method according to the embodiment of the present invention, in the background area estimating step, an amount of shift among the input images such that a luminance error of the overall image becomes the minimum among the input images, the amount of global shift not exceeding a threshold determined depending on a separation boundary based on which the background area is separated is calculated, thereby performing global image superimposition.

Preferably, in the background area estimating step, the estimation is performed with an area having the degree of local similarity higher than a predetermined threshold as the background area.

In addition, preferably, in the image processing method according to the embodiment of the present invention, for example, in the background area estimating step, a background template used to estimate the background area based on the degree of local similarity is updated/added whenever necessary.

According to another embodiment of the present invention, there is provided an image processing device including: storage means for storing therein data on input images synchronous with one another, the input images being obtained by photographing a subject from different points of sight with at least two cameras; background area estimation processing unit for estimating a background area based on a degree of local similarity after global image superimposition is performed on the assumption that the background area is in the distance and has a flat surface with respect to each of the input images synchronous with one another, the data on the input images being stored in the storage means; distance image generation processing unit for performing distance measurement by utilizing a stereo method with respect to points other than those in the background area estimated in the background area estimation processing unit to generate distance images; and background separated image generation processing unit for removing the image of the area in a predetermined distance or more from each of the input images by referring to the distance images generated in the distance image generation processing unit to generate a background separated image.

Preferably, the background area estimation processing unit calculates an amount of shift among the input images such that a luminance error of the overall image becomes the minimum among the input images, the amount of global shift not exceeding a threshold determined depending on a separation boundary based on which the background is separated, thereby performing global image superimposition.

In addition, preferably, the background area estimation processing unit estimates an area having the degree of local similarity higher than a predetermined threshold as the background area.

Also, preferably, in the image processing device according to the another embodiment of the present invention, for example, the background area estimation processing unit, whenever necessary, updates/adds a background template used to estimate the background area based on the degree of local similarity.

According to the present invention, performing the global and local background estimation makes it possible to more accurately generate the distance images. Thus, the foreground and the background can be separated from each other. The superimposition of the overall image is used and the rough background area is estimated, whereby the robust results can be obtained for a scene as well having many repetitive patterns and occlusions. In addition, the background template stacks are updated/added whenever necessary, which becomes robust against an environment change due to a lapse of time.

BRIEF DESCRIPTION OF THE DRAWINGS

FIG. 5 is a flow chart showing a flow of background area mask calculating processing executed in processing of Step S3 in the processing for separating a background and a foreground from each other shown in FIG. 3;

FIG. 6 is a view showing an example of an input image;

FIG. 15 is a view showing an input image and a background area mask.

DETAILED DESCRIPTION OF THE PREFERRED EMBODIMENTS

Hereinafter, preferred embodiments of the present invention will be described in detail with reference to the accompanying drawings. Incidentally, it is to be understood that the present invention is not intended to be limited to the following embodiments, and thus the various changes will arbitrarily occur to those skilled in the art without departing from the gist of the present invention.

Figure 1:
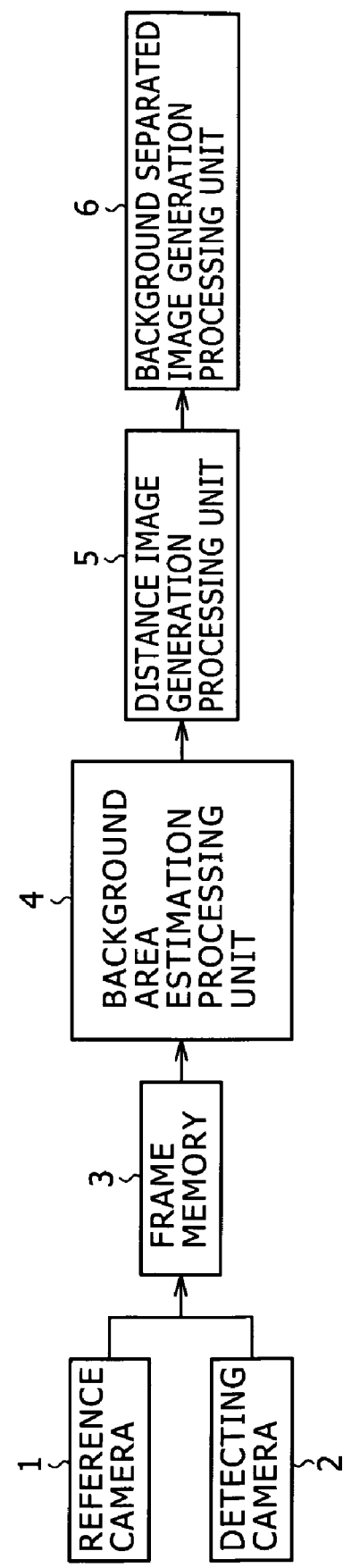
FIG. 1 is a block diagram showing a configuration of a visual communication apparatus to which the present invention is applied.

The present invention, for example, is applied to a visual communication apparatus 10 having a configuration as shown in FIG. 1.

The visual communication apparatus 10 has a function of estimating a background area by using a plurality of images captured with a plurality of cameras and of separating a background and a foreground from each other by utilizing distance measurement based on a stereo method. The visual communication apparatus 10 includes a reference camera 1, a detecting camera 2, a frame memory 3, a background area estimation processing unit 4, a distance image generation processing unit 5, and a background separation image generation processing unit 6.

It is supposed that the calibration is previously performed for a plurality of cameras used in the visual communication apparatus 10. While two or more cameras must be used, in this embodiment, the following description will be given with respect to a case where the two cameras (the reference camera 1 and the detecting camera 2) are used. The calibration is such that a point m for the reference camera 1 and a point m', corresponding to the point m, for the detecting camera 2 are obtained, and a constraint condition between the cameras for distance measurement is calculated.

In the visual communication apparatus 10, data on color images which are simultaneously captured with the reference camera 1 and the detecting camera 2 is accumulated in the frame memory 3 and the background area estimation processing unit 4 estimates a background area. Subsequently, the distance image generation processing unit 5 performs the distance measurement by utilizing the stereo method, which will be described later, with respect to points other than those in the background area estimated by the background area estimation processing unit 4. The background separated image generation processing unit 6 determines the final background area, performs the processing if necessary, and outputs data on a background separated image.

Here, the general camera calibration and distance measuring method will be described.

In this case, the point m on the image and a point M in the space are assigned $m=[u, v]^T$ and $M=[x, y, z]^T$, respectively, and descriptions of those points in a homogeneous coordinate system are assigned $\tilde{m}=[u, v, 1]^T$ and $\tilde{M}=[x, y, z, 1]^T$, respectively. A relationship between the point M in the space and the point m on the image is given by Expression 1:

$$s\tilde{m} = A \cdot [Rt] \cdot \tilde{M} \quad \text{(Expression 1)}$$
$$= P \cdot \tilde{M}$$

where s is a scale factor, a matrix [R t] is called an external parameter and represents a position of a camera within the space, and R and t represent a rotation matrix and a translation matrix, respectively. A matrix A is called an internal parameter of the camera and given by Expression 2:

$$A = \begin{bmatrix} \alpha & \gamma & u0 \\ 0 & \beta & v0 \\ 0 & 0 & 1 \end{bmatrix} \quad \text{(Expression 2)}$$

where (u0, v0) represents an image center, $\alpha=-f/ku$ and $\beta=-f \cdot kv/\sin\theta$ represent a scale factor of a u-axis and a scale factor of a v-axis, respectively, and $\gamma=f \cdot ku \cdot \cos\theta$ represents twisting of the two axes. In addition, a matrix $P=A \cdot [R\ t]$ is a projection matrix of 3×4 with which a point within the space is projected on an image surface. The above-mentioned description has shown transformation under the ideal condition without taking an influence of the lens distortion into consideration. However, since the influence of the distortion cannot be actually disregarded, the lens distortion is added as the camera parameter. A relationship between a point $m_d=[ud, vd]^T$ and a point $m=[u, v]^T$ in a distortion coordinate system can be expressed by Expression 3:

$$u=ud+(ud-cu) \cdot k \cdot rd^2$$
$$v=vd+(vd-cv) \cdot k \cdot rd^2 \quad \text{(Expression 3)}$$

where $rd^2$ is expressed by $((ud-cu)^2+(vd-cv)^2 sv^2)$, (cu, cv) represents a distortion center, and sv represents an aspect ratio.

Subsequently, a distance measuring method based on the stereo method will be described.

Figure 2:
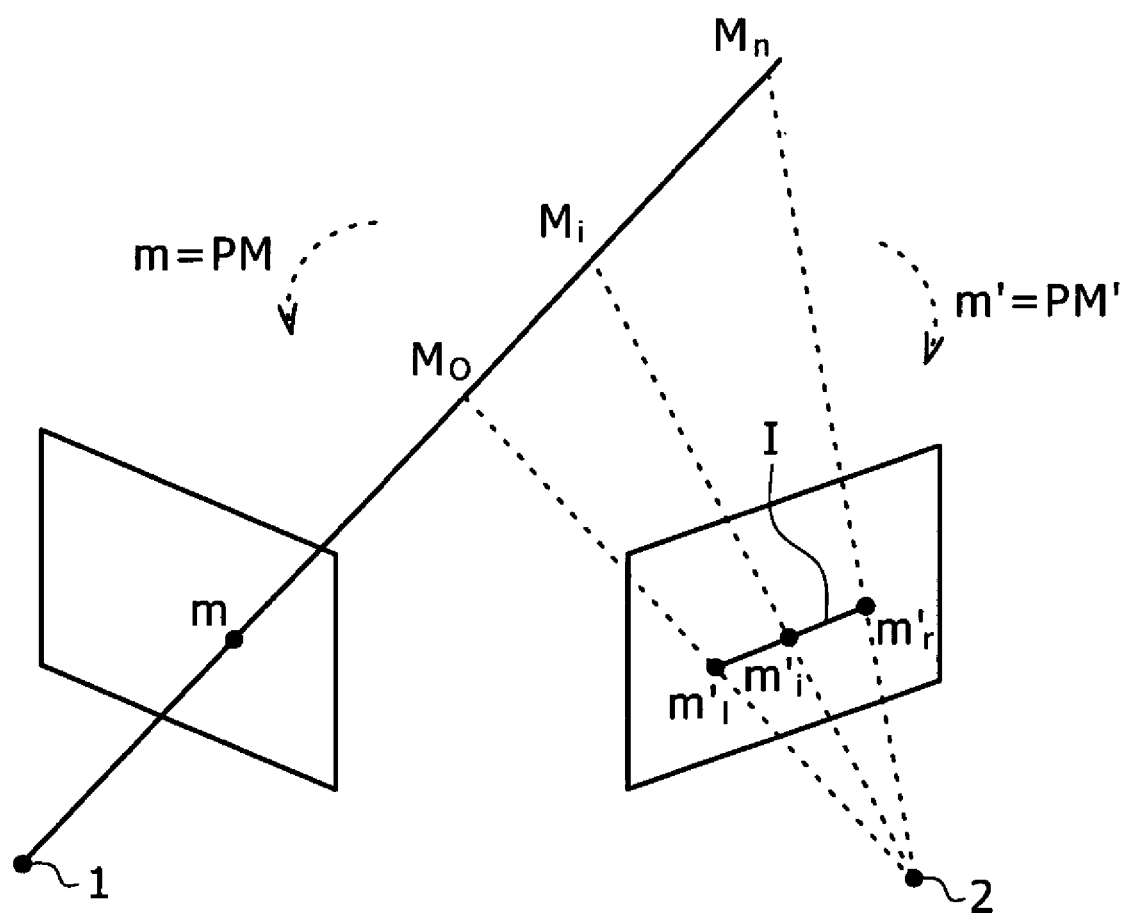
FIG. 2 is a view explaining a method of measuring a distance based on a stereo method.

As shown in FIG. 2, projection matrices on the reference camera 1 and the detection camera 2 are assigned P and P', respectively, and points on the images captured with the reference camera 1 and the detection camera 2 are assigned m and m', respectively. But, it is supposed that an influence of the distortion is removed from those points on the respective images as shown in Expression 3. When a distance to a point M is measured, it is necessary to detect the point m', on the detected image, corresponding to the point m on the reference image. Since the point m', as shown in FIG. 2, is located on a straight line 1 called an epipola line, in order to detect the point, on the detected image, corresponding to the point m, a search on this line must be performed. The epipola line is a set of points which are obtained by projecting points on a straight line between the camera center and the point m on the detecting camera 2. For example, when the measurement range in a Z-axis direction within the space is assigned (Z0–Zn), the epipola line becomes a straight line between points $m_0'$ and $m_n'$ which are obtained by projecting points $M_0$ and $M_n$ corresponding to the respective distances. In the actual search, a point located in a distance Zi is projected on the detected image, the degree of similarity with a point on the reference image is measured, and the correspondence between the points between the images is determined.

A procedure for projecting a point Mi, in a distance Zi, which is projected on the point m on the reference camera 1 on a point $m_i'$ on the detected image will be shown as follows.

A point on a line of sight passing through the point m can be expressed from Expression 1 by Expression 4:

$$\tilde{M} = sP^+ \cdot \tilde{m} + P^\perp \quad \text{(Expression 4)}$$

where $P^+$ is a pseudo inverse matrix. The pseudo inverse matrix $P^+$ is defined by Expression 5:

$$P^+ = P^T(PP^T)^{-1} \quad \text{(Expression 5)}$$

In addition, since $P^\perp$ becomes a vector fulfilling Expression 6 and is always projected on the origin, it represents actually the optical center and can be calculated from Expression 6.

$$P \cdot P^\perp = 0$$
$$P^\perp = (I-PP^+)\omega \quad \text{(Expression 6)}$$

where $\omega$ is an arbitrary four-dimensional vector.

Expression 4 represents all the points which pass through the optical center and the point m on the reference image. However, setting the distance as Zi makes it possible to determine the scale factor and determine the point Mi within the space. When this point is projected by using the projection matrix P', the point $m_i'$ on the detected image can be calculated.

From the foregoing, in order to obtain the point within the space, the camera parameters A, R, t, A', R', and t' of the respective cameras a and 2 must be individually obtained, or the projection matrices P and P' must be directly calculated and the distortion parameters k1, cu1, cv1, sv1, k2, cu2, cv2, and sv2 of the respective cameras 1 and 2 must be further calculated. Thus, calculating those parameters becomes the camera calibration.

Figure 3:
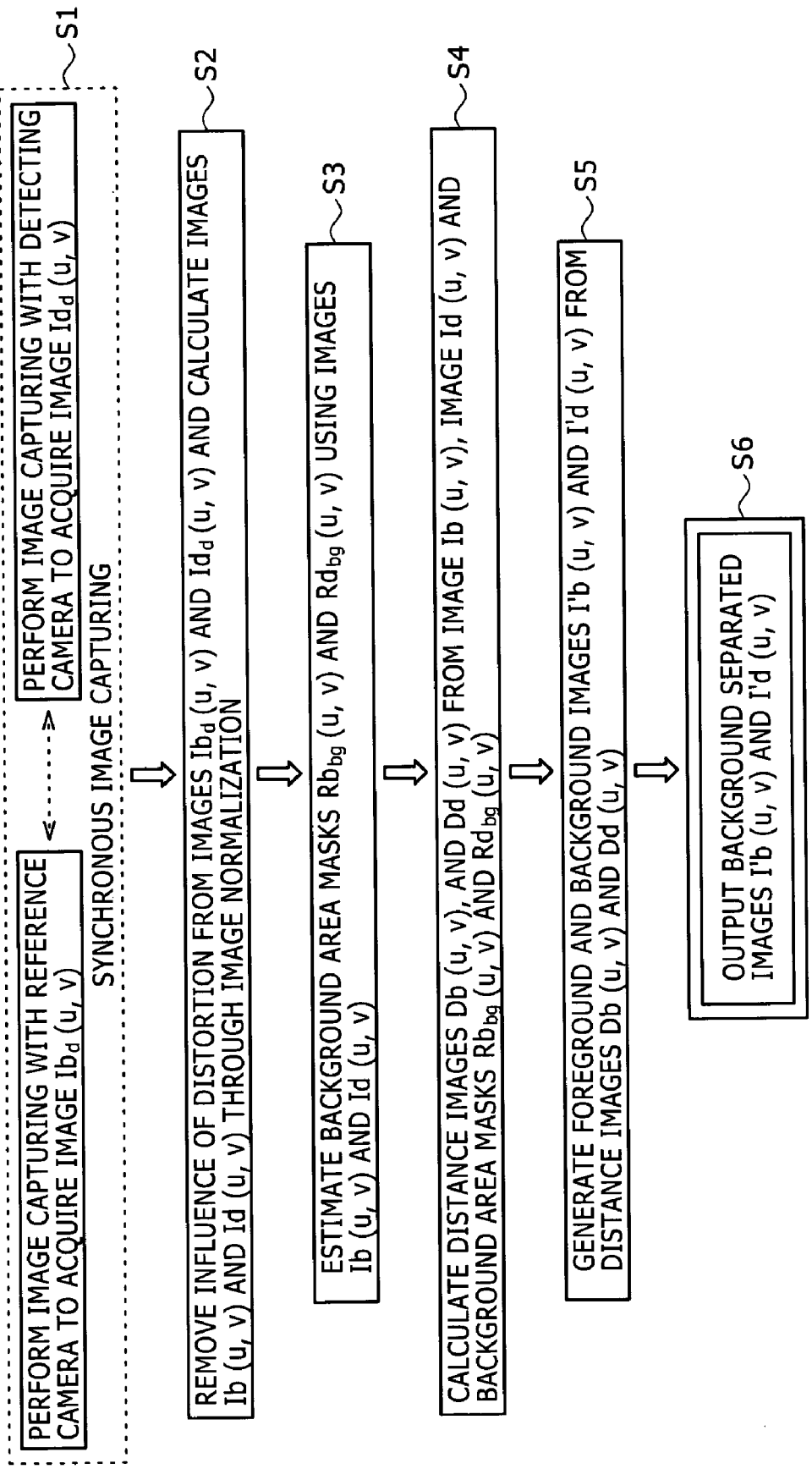
FIG. 3 is flow chart showing a flow of processing for separating a background and a foreground from each other in the visual communication apparatus shown in FIG. 1.

FIG. 3 shows a flow of processing for separating a background and a foreground from each other in the visual communication apparatus 10.

That is, in the visual communication apparatus 10, firstly, a subject is photographed from the different points of sight with the reference camera 1 and the detecting camera 2 to acquire input color images which are synchronous with each other (Step S1). Data on the acquired input images is stored in the frame memory 3.

the resulting matrices $P_n$ and $P_n'$ and the projection matrices P and P'.

(i) Calculation of Optical Centers

When the projection matrices P and P' are described by Expression 7, the optical centers $c1=[xc1, yc1, zc1]^T$ and $c2=[xc2, yc2, zc2]^T$ are given by Expression 8:

$$P = \begin{bmatrix} q_{11} & q_{12} & q_{13} & q_{14} \\ q_{21} & q_{22} & q_{23} & q_{24} \\ q_{31} & q_{32} & q_{33} & q_{34} \end{bmatrix} = \begin{bmatrix} q_1^T & q_{14} \\ q_2^T & q_{24} \\ q_3^T & q_{34} \end{bmatrix} = [Q|-Qc1] = [Q|q]$$

$$P' = \begin{bmatrix} q'_{11} & q'_{12} & q'_{13} & q'_{14} \\ q'_{21} & q'_{22} & q'_{23} & q'_{24} \\ q'_{31} & q'_{32} & q'_{33} & q'_{34} \end{bmatrix} = \begin{bmatrix} q_1'^T & q'_{14} \\ q_2'^T & q'_{24} \\ q_3'^T & q'_{34} \end{bmatrix} = [Q'|-Q'c2] = [Q'|q']$$

(Expression 7)

Subsequently, the background area estimation processing unit 4 removes the influence of the lens distortion from each of the input images the data on which is stored in the frame memory 3 by using the above-mentioned calibration parameters, and performs the image normalization (Step S2).

Figure 4:
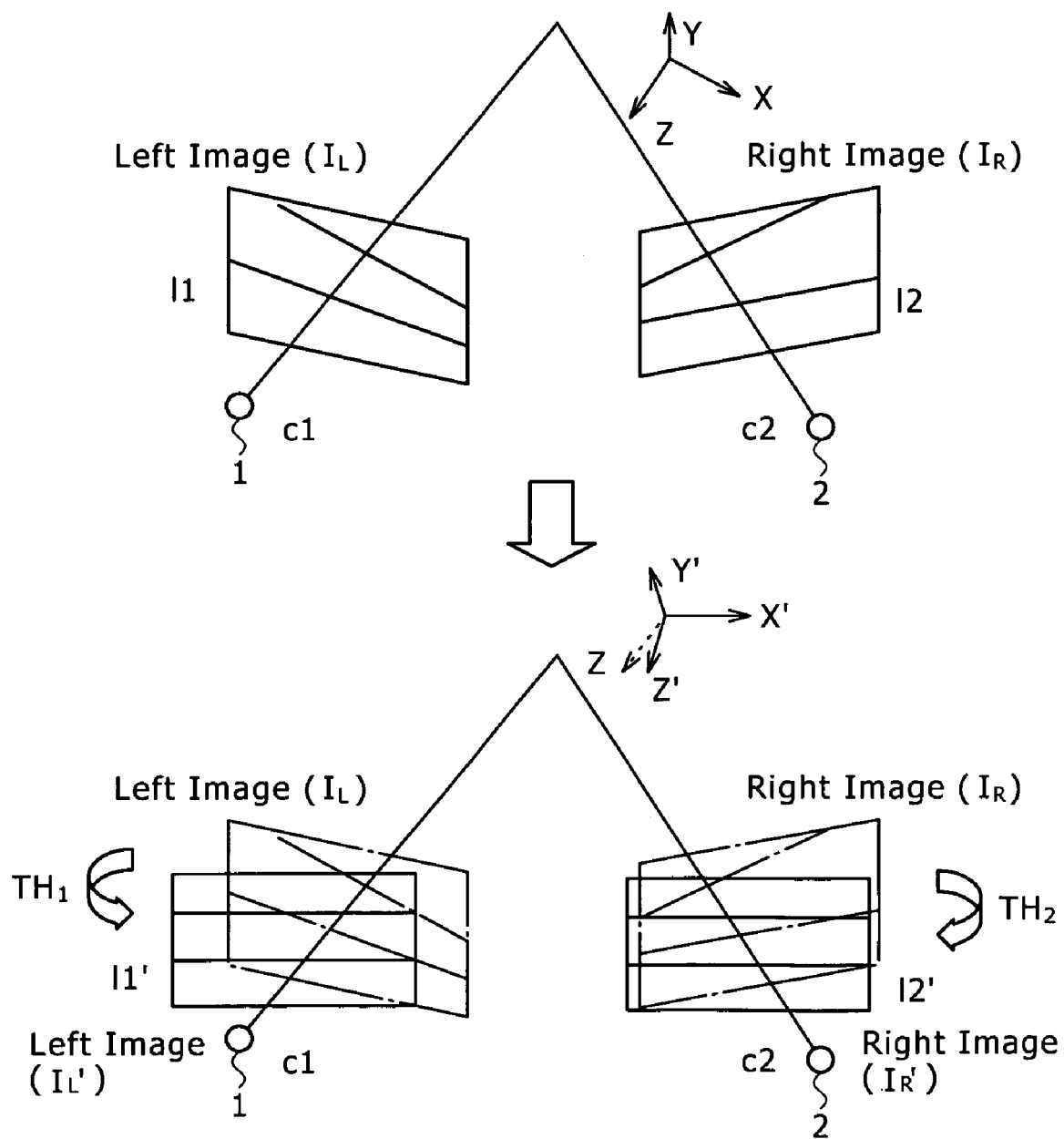
FIG. 4 is a view explaining image normalizing processing executed in processing of Step S2 in the processing for separating a background and a foreground from each other shown in FIG. 3.

That is, since each of the input images is influenced by the lens distortion, the influence of the lens distortion is removed therefrom by using Expression 3. In addition, the image normalization is such that as shown in FIG. 4, images $I_L$ and $I_R$ which are obtained by photographing a subject from different points c1 and c2 of sight with the two cameras 1 and 2 are transformed into images $I_L$ an $I_R$ which are obtained by photographing the subject with just like parallel cameras (left-hand and right-hand side cameras having parallel optical axes) As a result, the epipola lines which are not originally parallel with each other are parallelized and become parallel with a straight line between the optical centers (the points c1 and c2 of sight). When the projection matrix P and P' are obtained as the calibration parameters, transformation matrices TH1 and TH2 shown in FIG. 4 can be obtained by utilizing a method disclosed in the following reference literature for example. The input images are transformed by using the resulting transformation matrices TH1 and TH2 to generate a reference camera image Ib and a detecting camera image Id. [Reference literature: Andrea Fusiello, Emanuele Trucco and Alessandro Verri: A compact algorithm for rectification of stereo pairs, Machine Vision and Applications (2000)12, pp. 16 to 22]

That is, the transformation matrices are calculated from the projection matrices P and P' of the left-hand and right-hand side cameras.

Actually, the projection matrices P and P' are converted so that the X-axis of the XYZ coordinate system of the left-hand side camera which is used when the projection matrix P is obtained becomes parallel with the straight line between the optical centers c1 and c2 of the respective cameras 1 and 2, and the Y'-axis becomes perpendicular to a plane containing the straight line (X'-axis) between the optical centers c1 and c2 and the Z-axis. The transformation matrices are calculated from the corrected projection matrices $P_n$ and $P_n'$.

Hereinafter, a procedure for calculating the corrected projection matrices $P_n$ and $P_n'$ will be described. Also, a description will be given below with respect to a procedure for calculating the transformation matrices TH1 and TH2 from $$c1 = -Q^{-1}q$$

$$c2 = -Q'^{-1}q'$$

(Expression 8)

(ii) Calculation of X'-, Y'- and Z'-Axes

As described above, X'-axis is the vector linking the optical centers. Thus, when being expressed by $v1=[x1, y1, z1]^T$, the vector v1 of the X'-axis is obtained by Expression 9:

$$v1 = (c1 - c2)$$

(Expression 9)

In addition, the vector $v2=[x2, y2, z2]^T$ of the Y'-axis, as described above, is the vector perpendicular to the X'-axis and the Z-axis. Thus, when the projection matrix P is expressed by Expression 10, the vector v2 of the Y'-axis is expressed by $v2 = r_3 \wedge v1$:

$$P = A[Rt] = A \begin{bmatrix} r_1^T \\ r_2^T \\ r_3^T \end{bmatrix} t$$

(Expression 10)

Moreover, the vector $v3=[x3, y3, z3]^T$ of the Z'-axis is expressed as the vector perpendicular to the X'-axis and the Y'-axis by Expression 11:

$$v3 = v1 \wedge v2$$

(Expression 11)

(iii) Calculation of Projection Matrices $P_n$ and $P_n'$

The projection matrices $P_n$ and $P_n'$ are described by Expression 12:

$$P_n = A_n \cdot [R_n t_n]$$

$$P_n' = A_n \cdot [R_n t_n']$$

(Expression 12)

The rotation components of the internal parameters and the external parameters become identical to each other in the new projection matrices. Thus, in order to calculate the projection matrices $P_n$ and $P_n'$, the internal and external parameters $A_n$, $R_n$, $t_n$, and $t_n'$ must be calculated. The internal parameter $A_n$ is calculated by using the internal parameters of the projection matrices P and P' by Expression 13:

$$A_n = \frac{1}{2}(A + A')$$

(Expression 13)

In addition, the external parameter $R_n$ is calculated by using the vectors v1, v2, and v3 of the X'-axis, the Y'-axis, and the Z'-axis which are calculated in accordance with the procedure as described above by Expression 14:

$$R_n = \begin{bmatrix} v1'^T \\ v2'^T \\ v3'^T \end{bmatrix}$$ (Expression 14)

$$v1' = v1/\|v1\|$$

$$v2' = v2/\|v2\|$$

$$v3' = v3/\|v3\|$$ (Expression 14)

Also, the external parameters $t_n$ and $t_n'$ are calculated by using the external parameter $R_n$ and the optical centers c1 and c2 from Expression 7 by Expression 15:

$$t_n = -R_n c1$$

$$t_n' = -R_n c2$$ (Expression 15)

The projection matrices $P_n$ and $P_n'$ can be calculated from Expression 12 based on the above-mentioned calculation of the internal and external parameters $A_n$, $R_n$, $t_n$, and $t_n'$.

(iv) Calculation of Transformation Matrices TH1 and TH2

In this chapter, a description will be given below with respect to a method of calculating the transformation matrices TH1 and TH2 by using the projection matrices P, P', $P_n$, and $P_n'$.

When a point $\tilde{m} = [u, v, 1]^T$ of the captured image is assumed to be a point $\tilde{m}_n [u, v, 1]^T$ on the normalized image, a relationship between the point $\tilde{m} = [x, y, z, 1]^T$ and the point $\tilde{m}_n$ within the space can be described by Expression 16:

$$\tilde{m} = P\tilde{M} = [Q|-Qc1]\tilde{M}$$

$$\tilde{m}_n = P_n\tilde{M} = [Q_n|-Q_n c1]\tilde{M}$$ (Expression 16)

A straight line passing through the point $\tilde{m}$ and the point $\tilde{m}_n$ can be expressed from Expression 16 by Expression 17:

$$\tilde{M} = sQ^{-1}\tilde{m} + c1$$

$$\tilde{M} = s_n Q_n^{-1}\tilde{m}_n + c1$$ (Expression 17)

Hence, the relationship between the point $\tilde{m}$ and the point $\tilde{m}_n$ can be described by Expression 18:

$$\tilde{m}_n = \lambda Q_n Q^{-1}\tilde{m}$$ (Expression 18)

Since the transformation matrix is the matrix through which the point m on the captured image is projected on the point $m_n$ on the normalized image, a matrix $Q_n Q^{-1}$ becomes a transformation matrix. In other words, the transformation matrices TH1 and TH2 are calculated from Expression 19:

$$TH1 = Q_n Q^{-1}$$

$$TH2 = Q_n' Q'^{-1}$$ (Expression 19)

Subsequently, the background area estimation processing unit 4 calculates background area masks $Rb_{bg}(u, v)$ and $Rd_{bg}(u, v)$ (Step S3).

In this case, it is assumed that the background area is in the distance and near a flat surface. FIG. 5 shows a flow of processing for actually calculating the background area masks $Rb_{bg}(u, v)$ and $Rd_{bg}(u, v)$. In the background area masks $Rb_{bg}(u, v)$ and $Rd_{bg}(u, v)$, the background part is assigned "1" and other parts are assigned "0".

For example, in case of input images Ib (u, v) and Id (u, v) as shown in FIG. 6, the background area has many repetitive patterns and the large occlusion area. Thus, when the normal local area-based matching method is utilized, the corresponding unit cannot be determined with high accuracy. Then, firstly, the background area is estimated by using a global image superimposing technique.

Figure 7:
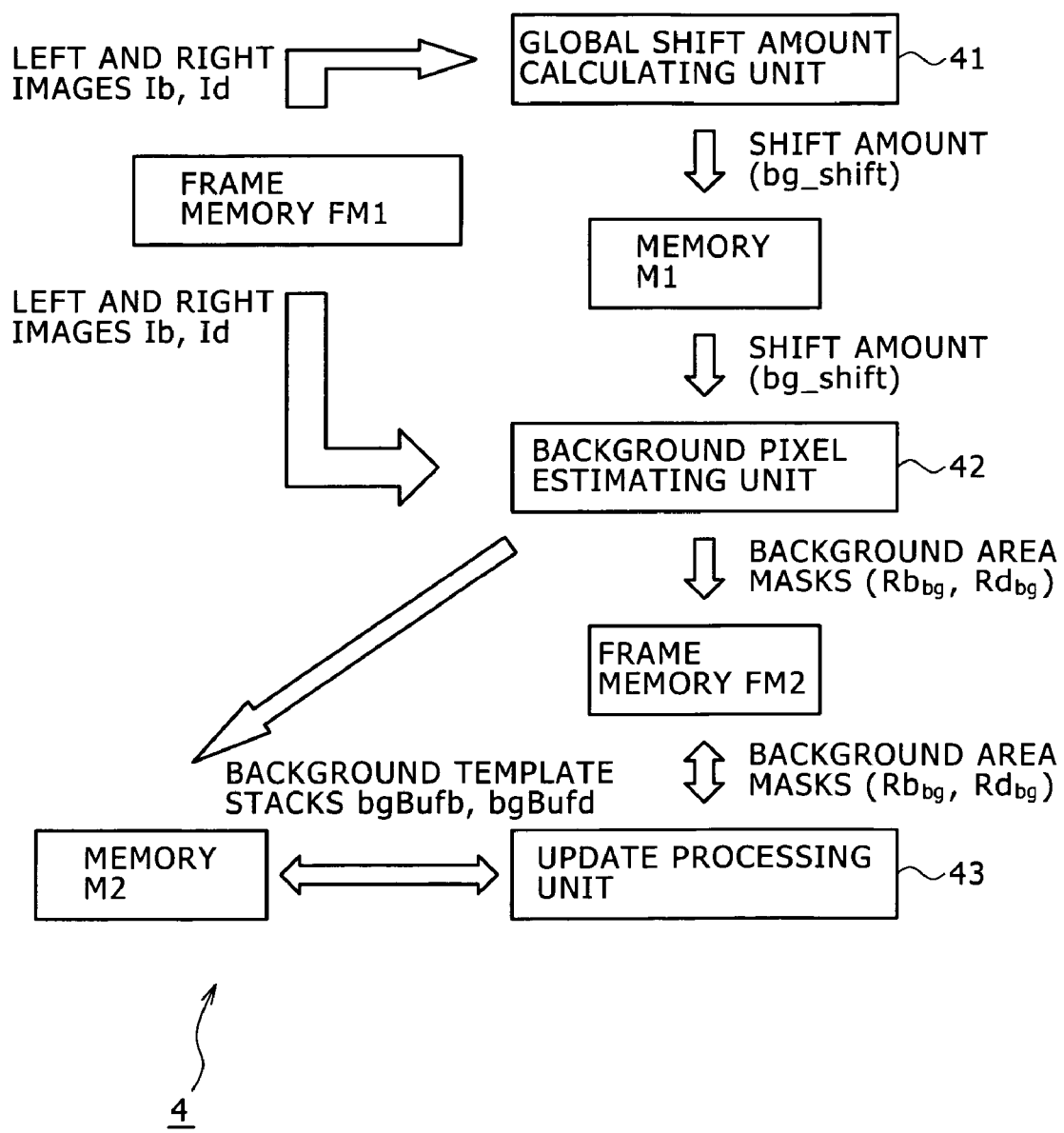
FIG. 7 is a functional block diagram showing a configuration of a background estimation processing unit in the visual communication apparatus shown in FIG. 1.

Here, the background area processing unit, as shown in a functional block diagram of FIG. 7, includes a global shift amount calculating unit 41, a background pixel estimating unit 42, and an update processing unit 43.

Then, in the processing of Step S3, as shown in FIG. 5, firstly, in processing of first Step S3-1, the global shift amount calculating unit 41 executes global shift amount calculation processing for obtaining a shift amount bg_shift such that a luminance error of the overall image becomes the minimum as shown in Expression 20 for the left-hand and right-hand side input images Ib (u, v) and Id (u, v) the data on which is stored in a frame memory FM1. Then, the global shift amount calculating unit 41 stores data on the resulting shit amount bg_shift in a memory M1.

$$E\_g = \sum_i |Ib(ui, vi) - Id(ui - bg\_shift, vi)|$$ (Expression 20)

But, in this case, it is assumed that the background area is in the distance, and $0 \leq bg\_shift < SHIFT\_THRESH$ is established. SHIFT_THRESH is a threshold which is adaptively determined depending on a separation boundary between the foreground and the background. An area in and after a certain distance is desired not to be watched, i.e., this area is made the background, thereby determining the threshold. In addition, since the image processing is executed on the assumption that the background has a flat surface, this reduces the resolution of the input images Ib (u, v) and Id (u, v). Thus, the shift amount bg_shift is calculated from Expression 20. Since the input images Ib (u, v) and Id (u, v) are normalized in the processing of Step S2, a shift amount in a direction of a u-axis has only to be obtained in this case.

Figure 8:
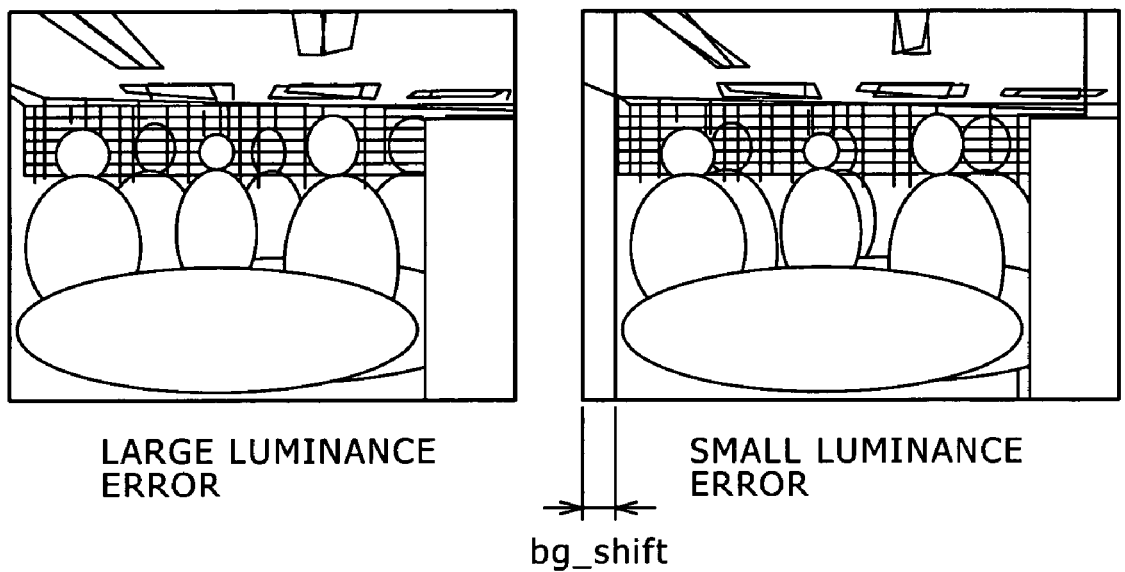
FIG. 8 is a view showing an example of image superimposition.
Figure 9:
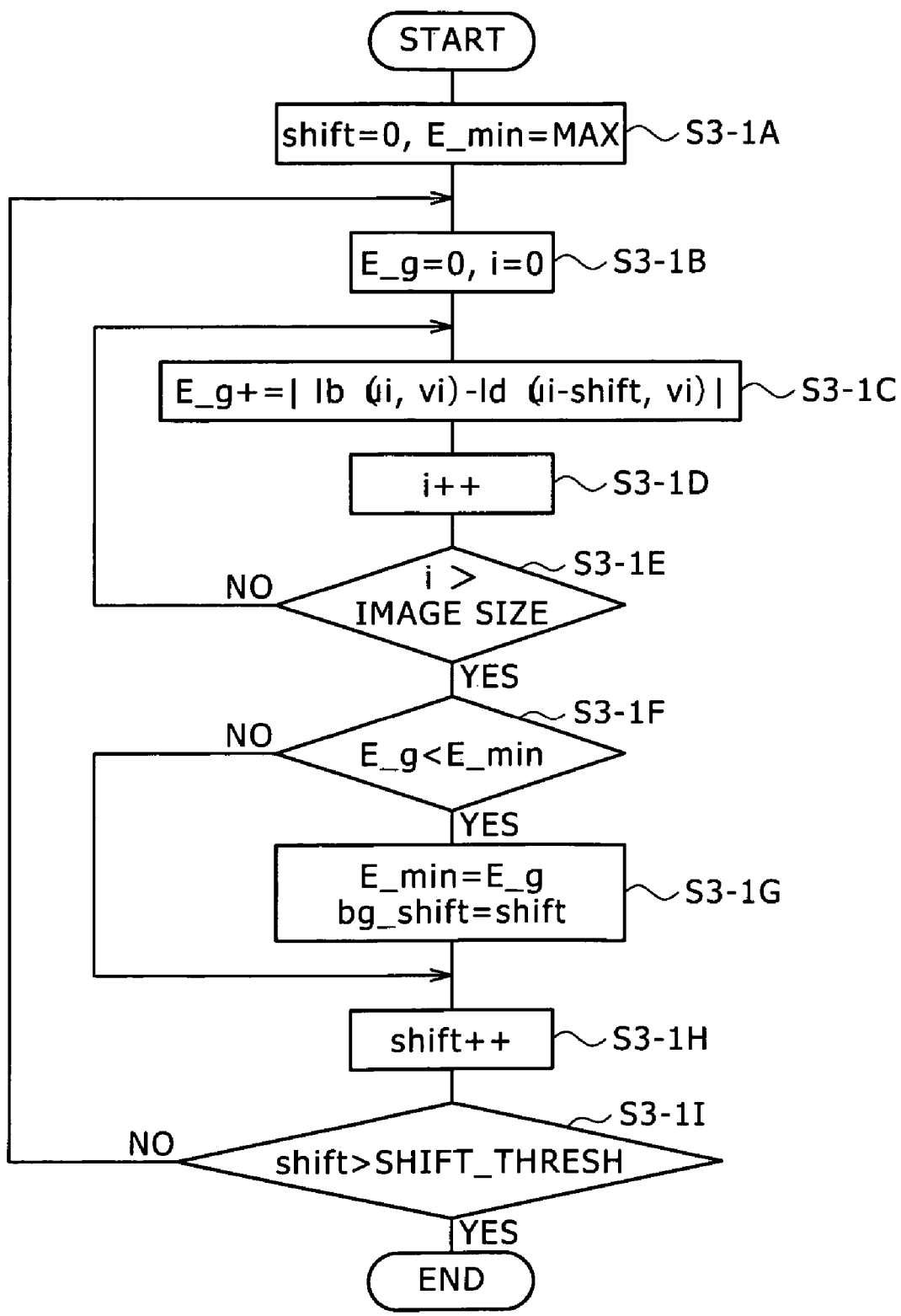
FIG. 9 is a flow chart showing a flow of global shift amount calculating processing of Step S3-1 in the background area mask calculating processing shown in FIG. 5.

FIG. 8 shows an example of the image superimposition, and FIG. 9 shows a concrete flow of global shift amount calculating processing of Step S3-1.

That is, in the global shift amount calculating processing of Step S3-1, firstly, shift and E_min are initialized to zero and MAX, respectively (Step S3-1A). Moreover, E_g=0, i=0 are obtained, i.e., variables E_g and i are reset to "0" (Step S3-1B).

Next, $E\_gt^+ = |Ib(ui, vi) - Id(ui-shift, vi)|$ is obtained, i.e., a sum of absolute values of differences between Ib (ui, vi) and Id (ui-shift, vi) is obtained with respect to the input images Ib (u, v) and Id (u, v) (Step S3-1C). The variable i is then incremented (Step S3-1D). It is then determined whether or not the incremented variable i becomes larger than an image size (Step S3-1E).

When the determination results in Step S3-1E show NO, the operation returns back to the processing of Step S3-1C, and the processing from Step S3-1C to Step S3-1E is repeatedly executed. As a result, when the determination results in Step S3-1E come to show YES, it is determined whether or not the variable E_g representing the sum of the absolute values of the differences between Ib (ui, vi) and Id (ui-shift, vi) is smaller than a variable E min (Step S3-1F).

When the determination results in Step S3-1F show YES, the variable E_min is made equal to the value of the variable E_g representing the above-mentioned sum of the absolute values, and a shift amount bg_shift is made equal to the value of the variable shift (Step S3-1G). Thereafter, the variable shift is incremented (Step S3-1H). On the other hand, when the determination results in Step S3-1F show NO, the variable shift is immediately increased (Step S3-1H).

Then, it is determined whether or not the variable shift incremented in Step S3-1H is larger than a threshold SHIFT_THRESH (Step S3-1I).

When the determination results in Step S3-1I show NO, the operation returns back to the processing of Step S3-1B. Then, the processing from Step S3-1B to Step S3-1I is repeatedly executed until the incremented variable shift becomes larger than the threshold SHIFT_THRESH. As a result, when the determination results in Step S3-1I come to show YES, the global shift amount calculating processing is completed.

Figure 10:
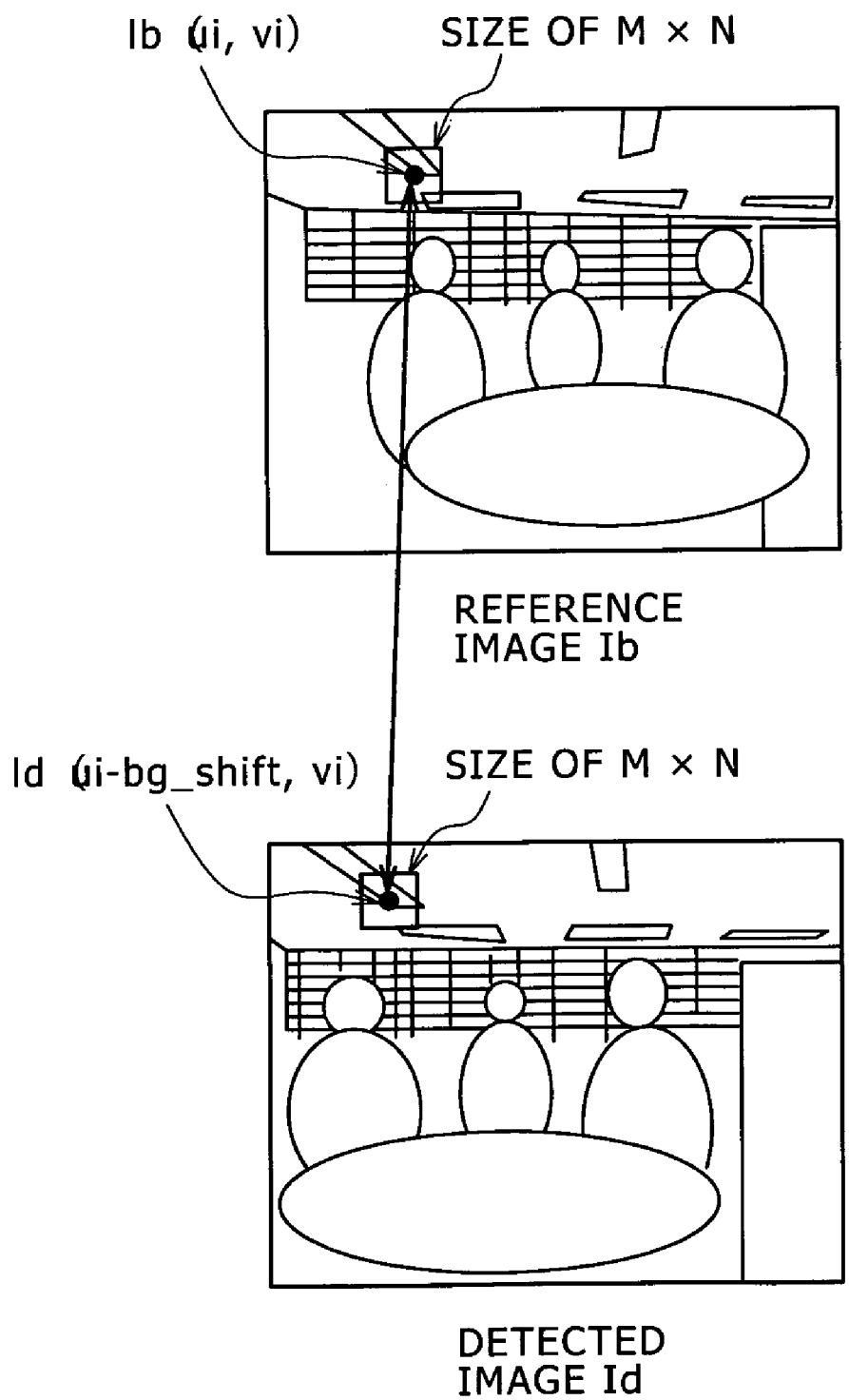
FIG. 10 is a view showing an outline of local similarity degree calculating processing of Step S3-2 in the background area mask calculating processing shown in FIG. 5.
Figure 11:
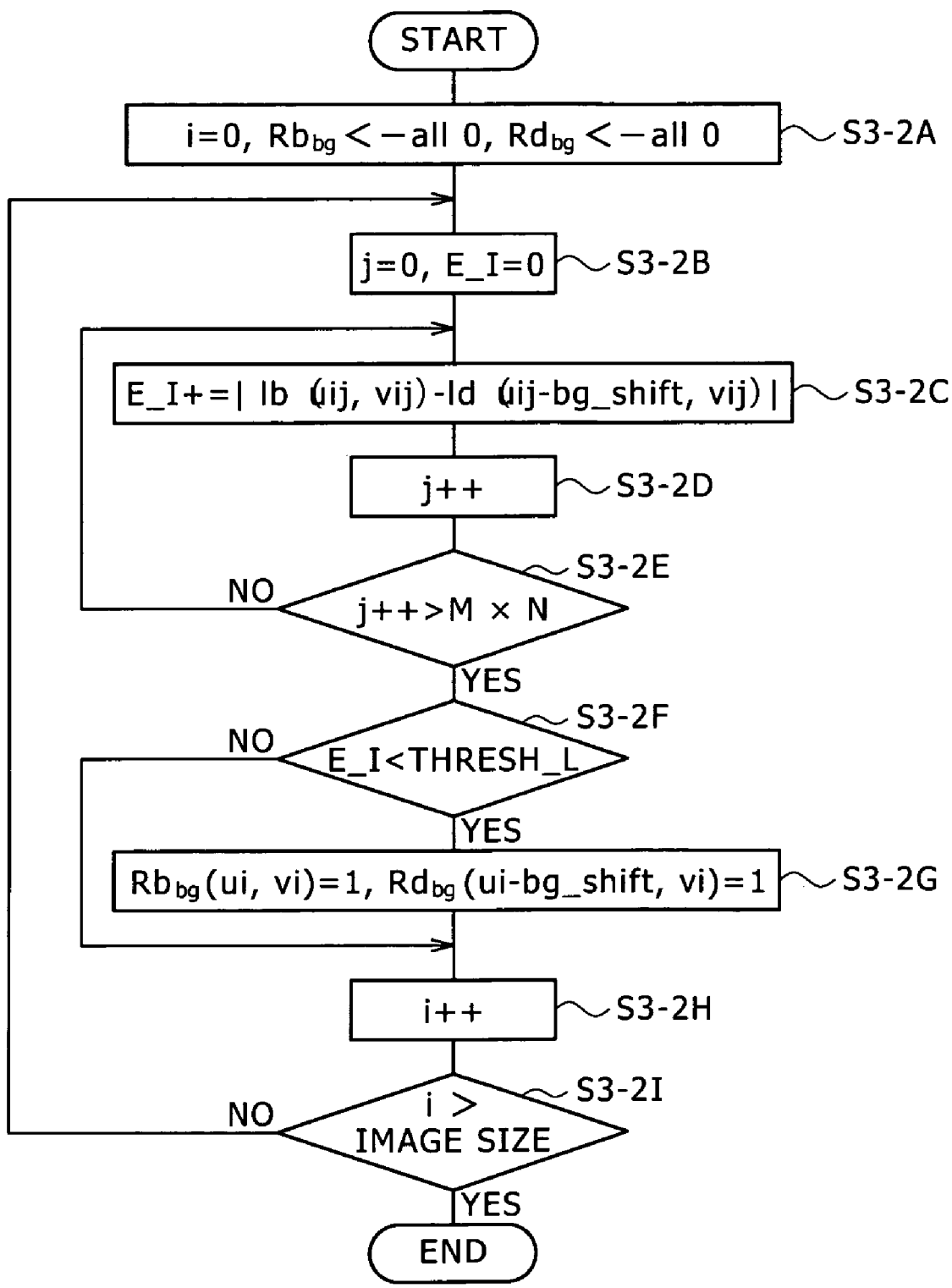
FIG. 11 is a flow chart showing a flow of the local similarity degree calculating processing of Step S3-2 in the background area mask calculating processing shown in FIG. 5.

Next, in the processing of Step S3-2, the background pixel estimating unit 42 performs the local matching with respect to the left-hand and right-hand side input images Ib (u, v) and Id (u, v) both the data on which is stored in the frame memory FM1 by using the shift amount bg_shift obtained in the global shift amount calculating processing of Step S3-1. More specifically, as shown in FIG. 10, a luminance error E_l within a Window size of M×N is calculated. When E_l<THRESH_L, points (ui, vi) and (ui−bg_shift, vi) of the images Ib and Id are made the background area. In other words, $Rb_{bg}$ (vi, ui)=1 and $Rd_{bg}$ (ui−bg_shift, vi)=1 are obtained. The data on the background area estimated through the local matching is stored as the background area masks $Rb_{bg}$ and $Rd_{bg}$ in the frame memory FM2 and the memory M2, respectively. FIG. 11 shows a concrete flow of the processing of Step S3-2.

That is, in the processing of Step S3-2, firstly, the initialization for obtaining i=0, $Rb_{bg}$≦all0, and $Rd_{bg}$≦all0 is performed (Step S3-2A). Then, j=0 and E_l=0 are obtained, i.e., the variables j and E_l are reset to "0" (Step S3-2B).

Next, E_l$^+$=|Ib (uij, vij)−Id (uij−bg_shift, vij)| is obtained, i.e., a sum of absolute values of differences between Ib (uij, vij) and Id (uij−bg_shift, vij) is obtained as the luminance error E_l (Step S3-2C). The variable j is then incremented (Step S3-2D). It is determined whether or not the incremented variable j becomes larger than the Window size of M×N (Step S3-2E).

When the determination results in Step S3-2E show NO, the operation returns back to the processing of Step S3-2C, and the processing from Step S3-2C to Step S3-2E is repeatedly executed. As a result, when the determination results in Step S3-2E come to show YES, it is determined whether or not the resulting luminance error E_l within the Window size of M×N is smaller than a threshold THRESH_L (Step S3-2F).

When the determination results in Step S3-2F show YES, after $Rb_{bg}$ (ui, vi)=1 and $Rd_{bg}$ (ui−bg_shift, vi)=1 are obtained, i.e., the points (ui, vi) and (ui−bg_shift, vi) of the images Ib and Id are made the background area (Step S3-2G), the variable i is incremented (Step S3-2H). On the other hand, when the determination results in Step S3-2F show NO, the variable i is immediately incremented (Step S3-2H).

It is then determined whether or not the variable i incremented in Step S3-2H is larger than the image size (Step S3-2I).

When the determination results in Step S3-2I show NO, the operation returns back to the processing of Step S3-2B. The processing from Step S3-2B to Step S3-2I is then repeatedly executed until the incremented variable i becomes larger than the image size. As a result, when the determination results in Step S3-2I come to show YES, the local similarity degree calculating processing is completed.

Figure 12:
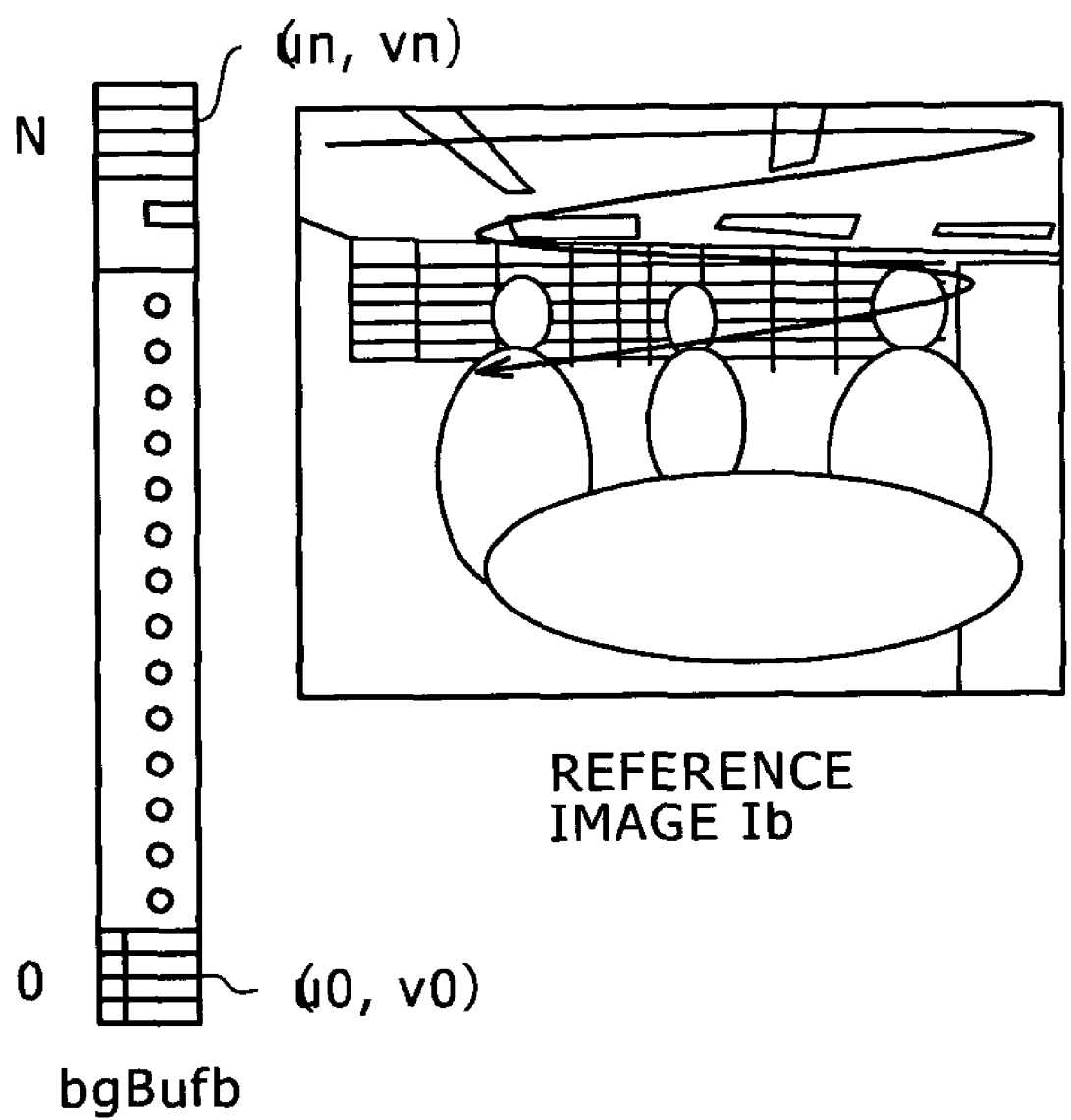
FIG. 12 is a view showing an outline of background template stack comparing processing of Step S3-3 in the background area mask calculating processing shown in FIG. 5.
Figure 13:
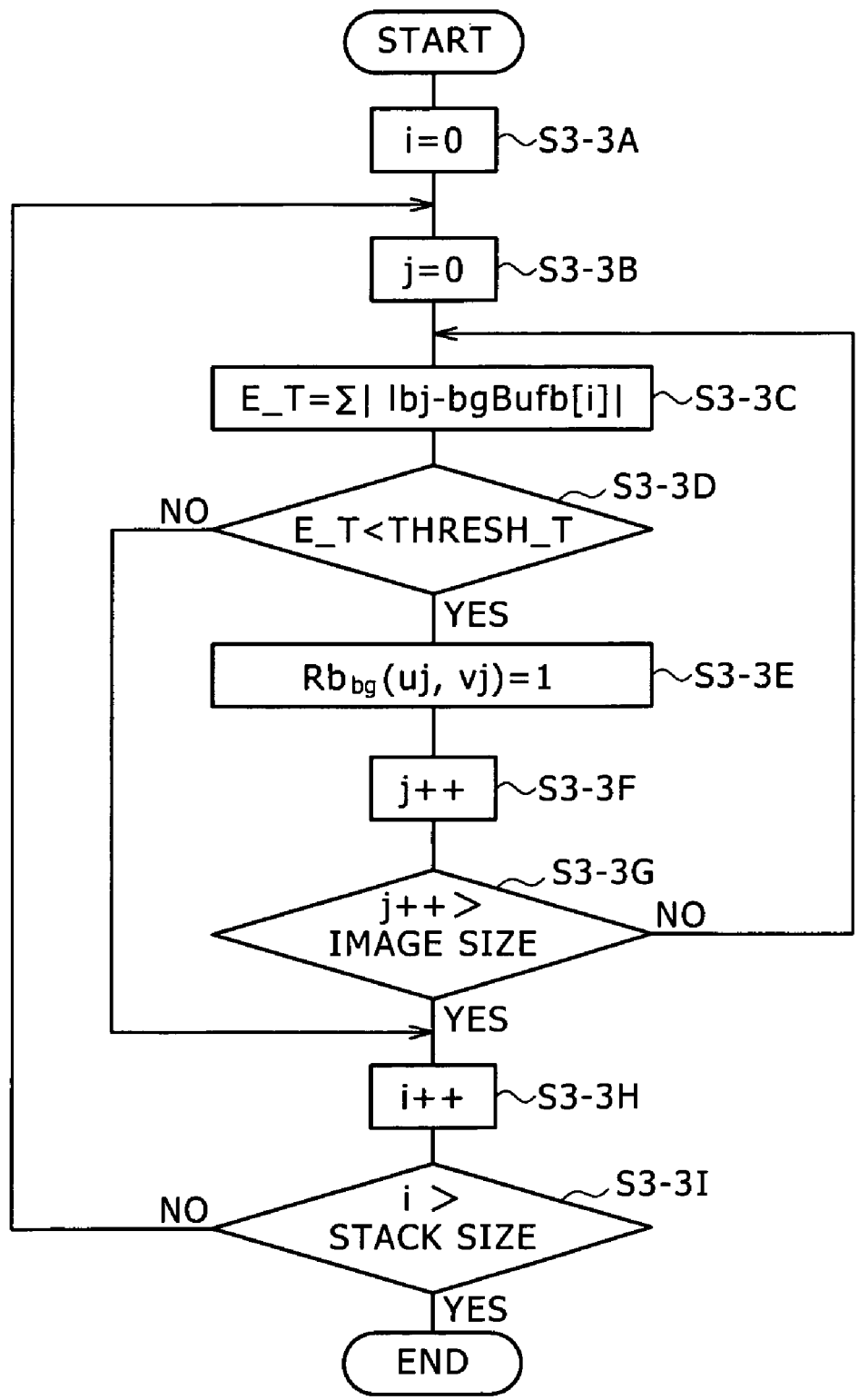
FIG. 13 is a flow chart showing a flow of the background template stack comparing processing of Step S3-3 in the background area mask calculating processing shown in FIG. 5.

Next, in the processing of Step S3-3, the image Ib captured with the reference camera 1 and the image Id captured with the detecting camera 2 are compared with the background template stacks bgBufb and bgBufd, respectively. Each of the background template stacks bgBufb and bgBufd is a stack of a local image which is obtained by cutting down a peripheral area (M×N) of the points made the background in the frame by a time (T−1). Also, each of the background template stacks bgBufb and bgBufd has luminance information having a size of (M×N) and its central coordinates (ui, vi). The matching between each template stacked on the background template stack bgBufb and the image Ib (ui, vi) captured with the reference camera 1 is performed and a luminance error E_T is calculated. When E_T<THRESH_T, the point (ui, vi) is made the background area, and $Rb_{bg}$ (ui, vi)=1 is obtained. The background template stack bgBufd is used for the image Id captured with the detecting camera 2, and the same processing as that for the image Ib is executed to generate the background area mask $Rb_{bg}$ (u, v) FIG. 12 shows an outline of the processing of Step S3-3 for the reference camera 1, and FIG. 13 shows a concrete flow of the processing of Step S3-3.

That is, in the processing of Step S3-3, firstly, the variable i is initialized to "0" (Step S3-3A), and j=0 is then obtained, i.e., the variable j is then reset to "0" (Step S3-3B).

Next, E_T=Σ|Ibj−bgBufb[i]| is obtained, i.e., a sum of absolute values of differences between Ibj and bgBufb[i] is obtained as the luminance error E_T with respect to the input images Ib (u, v) and Id (u, v) (Step S3-3C). It is then determined whether or not the resulting luminance error E_T is smaller than a threshold E_T<THRESH_T (Step S3-3D).

When the determination results in Step S3-3D show YES, after $Rb_{bg}$ (ui, vi), i.e., the point (ui, vi) is made the background area (Step S3-3E), the variable j is incremented (Step S3-3F). It is then determined whether or not the incremented variable j becomes larger than the image size (Step S3-3G).

When the determination results in Step S3-3G show NO, the operation returns back to the processing of Step S3-3C, and the processing from Step S3-3C to Step S3-3G is repeatedly executed. As a result, when the determination results in Step S3-3G come to show YES, the variable j is incremented (Step S3-3H). On the other hand, when the determination results in Step S3-3D show NO, the variable i is immediately incremented (Step S3-3H).

It is then determined whether or not the variable i incremented in Step S3-3H is larger than the stack size (Step S3-3I).

When the determination results in Step S3-3I show NO, the operation returns back to the processing of Step S3-3B. The processing from Step S3-3B to Step S3-3I is then repeatedly executed until the incremented variable i becomes larger than the stack size. As a result, when the determination results in Step S3-3I come to show YES, the processing for comparison with the templates is completed.

Figure 14:
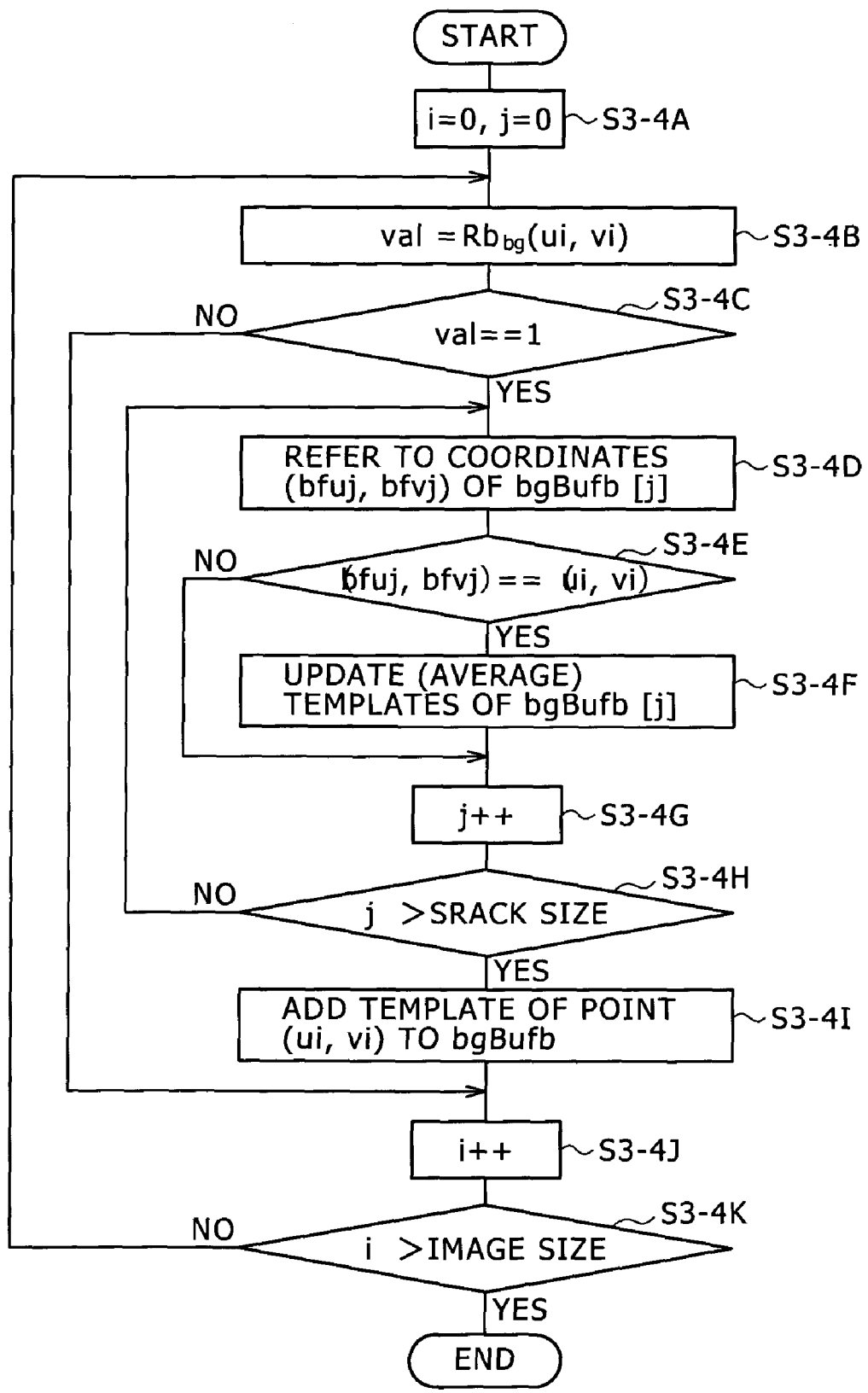
FIG. 14 is a flow chart showing a flow of background template updating processing of Step S3-4 in the background area mask calculating processing shown in FIG. 5.

Subsequently, in the processing of Step S3-4, the update processing unit 43 updates the background template stacks by using the background area masks $Rb_{bg}$ (u, v) and $Rd_{bg}$ (u, v) which are generated in the above-mentioned processing. More specifically, an area $R_n$ of the peripheral pixels of M×N of the point (ui, vi) which has the background area mask value of 1, i.e., which is estimated to be the background is cut down, and reference is then made to the background template stacks. When the background template for the point (ui, vi) previously exists, the existing template and the new template $R_n$ are averaged. On the other hand, when no background template for the point (ui, vi) previously exists, the new template is stacked. FIG. 14 shows a concrete flow of the update processing for the reference camera 1.

That is, in the processing of Step S3-4, firstly, the variables i and j are initialized to "0" (Step S3-4A)

Next, val=$Rb_{bg}$ (ui, vi) is obtained, i.e., a variable val is made equal to the value of $Rb_{bg}$ (ui, vi) (Step S3-4B), and it is determined whether or not the value of the variable val is "1" (Step S3-4C).

When the determination results in Step S3-4C show YES, reference is made to coordinates (bfuj, bfvj) of bgBufb[j] (Step S3-4D). It is then determined whether or not the coordinates (bfuj, bfvj) agree with a point (uj, vj) (Step S3-4E).

When the determination results in Step S3-4E show YES, after the template for bgBufb[j] is updated (Step S3-4F), the variable j is incremented (Step S3-4G). On the other hand, when the determination results in Step S3-4E show NO, the variable j is immediately incremented (Step S3-4G).

Next, it is determined whether or not the variable j incremented in Step S3-4G becomes larger than the stack size (Step S3-4H).

When the determination results in Step S3-3H show NO, the operation returns back to the processing of Step S3-4D, and the processing from Step S3-4D to Step S3-4H is then repeatedly executed. As a result, when the determination results in Step S3-4H come to show YES, the template for the point (uj, vj) is added to bgBufb (Step S3-4I), and the variable i is incremented (Step S3-4J). On the other hand, when the determination results in Step S3-4C show NO, the variable i is immediately incremented (Step S3-4J).

It is then determined whether or not the variable i incremented in Step S3-4J is larger than the image size of the variable i (Step S3-4K).

When the determination results in Step S3-4K show NO, the operation returns back to the processing of Step S3-4B, and the processing from Step S3-4B to Step S3-4K is then repeatedly executed until the incremented variable i becomes larger than the image size. As a result, when the determination results in Step S3-4K come to show YES, the processing for updating the background templates is completed.

Next, the distance image generation processing unit 5 calculates distance information by using the background area masks $Rb_{bg}$ (u, v) and $Rd_{bg}$ (u, v) which are generated in the processing of Step S3 (Step S4).

Here, in the processing of Step S4, distance images Db (u, v) and Dd (u, v) are generated based on the information of the background area masks $Rb_{bg}$ (u, v) and $Rd_{bg}$ (u, v) which are generated in the processing of Step S3. The values of the distance images in the processing of Step S4 are set as shift amounts in a u-axis direction since the input images Ib (u, v) and Id (u, v) are normalized in the processing of Step S2. In other words, when the point corresponding to the point Ib (ui, vi) on the reference camera image Ib (u, v) is made the point Id (ui-shift, vi) on the detecting camera image Id (u, v), Db (ui, vi)=shift is obtained. The various methods are known-as the method of searching for a corresponding point. In this case, however, the corresponding point is obtained by searching for a point in which a luminance error between the peripheral area of M×N of the point (ui, vi) on the reference camera image Ib (u, v) and the peripheral area of M×N of the point (ui-shift, vi) on the detecting camera image Id (u, v) becomes the minimum. At this time, as shown in FIG. 15, any of the points made the background area (background area mask takes 1) is excluded in search by utilizing the background area mask information. As a result, the matching can be more accurately performed than the matching for the area base for the overall ordinary input image can be done.

The background separated image generation processing unit 6 removes any of the points (ui, vi) each having a distance equal to or smaller than a-threshold from the input images Ib (u, v) and Id (u, v) by referring to the distance area images Db (u, v) and Dd (u, v) which are generated in the processing of Step S4 Then, the background separated image generation processing unit 6 generates background separated images Ib' (u, v) and Id' (u, v) (Step S5), and outputs the resulting background separated images Ib' (u, v) and Id' (u, v) (Step S6). In the threshold processing in this case, the points each in a certain distance or more are made the background.

For the background separated images Ib' (u, v) and Id' (u, v) which are generated in the above-mentioned processing, the global and local background estimation is performed for the input images Ib (u, v) and Id (u, v), the distance images are generated, and the background separation is performed for the distance images. As a result, the background separation becomes possible which is more accurate than that utilizing the method in which the distance images are generated for the overall input images Ib (u, v) and Id (u, v), and the background separation is then performed. In addition, the background template stacks are updated/added whenever necessary, which becomes robust against the environment change due to a lapse of time. Moreover, the superimposition of the overall image is used and the rough background area is estimated, whereby the robust results can be obtained for a scene as well having many repetitive patterns and occlusions.

While preferred embodiments of the present invention have been described using specific terms, such description is for illustrative purposes only, and it is to be understood that changes and variations may be made without departing from the spirit or scope of the following claims.

What is claimed is:

1. A method of separating a background area of an image using an image processing device, the method comprising the steps of:
    capturing images of a subject from different points of sight with at least two cameras to obtain input images synchronous with one another;
    performing global image superposition, using the image processing device, by calculating an amount of global shift among the input images such that a luminance error of an overall image becomes the minimum among the input images, the amount of global shift not exceeding a threshold determined depending on a separation boundary based on which the background area is separated;
    estimating a background area, using the image processing device, based on a degree of similarity after global image superimposition is performed on the assumption that the background area is in the distance and has a flat surface with respect to each of the input images obtained in said capturing step;
    generating distance images, using the image processing device, by performing distance measurement utilizing a stereo method with respect to points other than those in the background area estimated in said background area estimating step; and
    generating a background separated image, using the image processing device, by referring to the distance images generated in said distance image generating step and removing the points having a predetermined distance or more from each of the input images.

2. The image processing method according to claim 1 wherein, in said background area estimating step, the estimation is performed with an area having the degree of local similarity higher than a predetermined threshold as the background area.

3. The image processing method according to claim 1 wherein, in said background area estimating step, a background template used to estimate the background area based on the degree of local similarity is updated when the background template exists and added when the background template does not exist.

4. An image processing device comprising:

memory for storing therein data on input images synchronous with one another, the input images being obtained by photographing a subject from different points of sight with at least two cameras;

a background area estimation processing unit for estimating a background area based on a degree of local similarity after global image superimposition of the input images obtained from the at least two cameras is performed on the assumption that the background area is in the distance and has a flat surface with respect to each of the input images synchronous with one another, wherein the degree of local similarity is determined by calculating a luminance error of an area of an overall image and estimating the area as the background area when the calculated luminance error is less than a predetermined threshold, the data on the input images being stored in said memory;

a distance image generation processing unit for performing distance measurement utilizing a stereo method with respect to points other than those in the background area estimated in said background area estimation processing unit to generate distance images; and a background separated image generation processing unit for removing the points having a predetermined distance or more from each of the input images by referring to the distance images generated in said distance image generation processing unit to generate a background separated image.

5. An image processing device comprising:

storage means for storing therein data on input images synchronous with one another, the input images being obtained by photographing a subject from different points of sight with at least two cameras;

a background area estimation processing unit for calculating an amount of global shift among the input images such that a luminance error of an overall image becomes the minimum among the input images, the amount of global shift not exceeding a threshold determined depending on a separation boundary based on which the background is separated;

a distance image generation processing unit for performing distance measurement utilizing a stereo method with respect to points other than those in the background area estimated in said background area estimation processing unit to generate distance images; and a background separated image generation processing unit for removing the points having a predetermined distance or more from each of the input images by referring to the distance images generated in said distance image generation processing unit to generate a background separated image.

6. The image processing device according to claim 5 wherein, said background area estimation processing unit estimates an area having the degree of local similarity higher than a predetermined threshold as the background area.

7. The image processing device according to claim 5 wherein, said background area estimation processing unit updates a background template used to estimate the background area based on the degree of local similarity when the background template exists and adds the background template when it does not exist.

* * * * *